United States Patent

Adler

[11] 4,183,370
[45] Jan. 15, 1980

[54] PRESSURE RELIEF VALVE

[75] Inventor: Franklin P. Adler, Michigan City, Ind.

[73] Assignee: Pullman Incorporated, Chicago, Ill.

[21] Appl. No.: 939,091

[22] Filed: Sep. 1, 1978

Related U.S. Application Data

[62] Division of Ser. No. 706,650, Jul. 19, 1976, Pat. No. 4,119,112.

[51] Int. Cl.² ............................................. F16K 17/40
[52] U.S. Cl. ..................................... 137/68 R; 138/93
[58] Field of Search ...................................... 137/67–71; 138/93; 220/89 A, 207, 232; 222/396

[56] References Cited

U.S. PATENT DOCUMENTS

| 776,834 | 12/1904 | Goebel | 220/89 A |
| 1,873,138 | 8/1932 | Mitchell | 138/93 X |
| 3,145,874 | 8/1964 | Webb | 220/89 A |
| 3,229,635 | 1/1966 | Oss | 220/89 A X |
| 3,469,734 | 9/1969 | Davis et al. | 220/89 A |
| 3,515,309 | 6/1970 | Welch | 220/89 A |
| 3,845,878 | 11/1974 | Carlson | 220/89 A |

*Primary Examiner*—Martin P. Schwadron
*Assistant Examiner*—Richard Gerard
*Attorney, Agent, or Firm*—Richard J. Myers

[57] ABSTRACT

A safety vent for hopper cars includes a tubular housing member adapted to communicate with the interior of a hopper which may be unloaded by creating a sub-atmospheric pressure therein. The vent includes a rupturable diaphragm normally blocking the entrance of air through the tubular housing to the hopper. The diaphragm comprises a material which is stretched across a tubular wall of the tubular member in a tensioned condition, and which at a predetermined PSI within the hopper, ruptures whereupon the ruptured pieces of the diaphragm recede radially outwardly against the wall of the tubular housing in a manner to occupy a minimal amount of space thereby permitting the free flow of air into the hopper.

5 Claims, 5 Drawing Figures

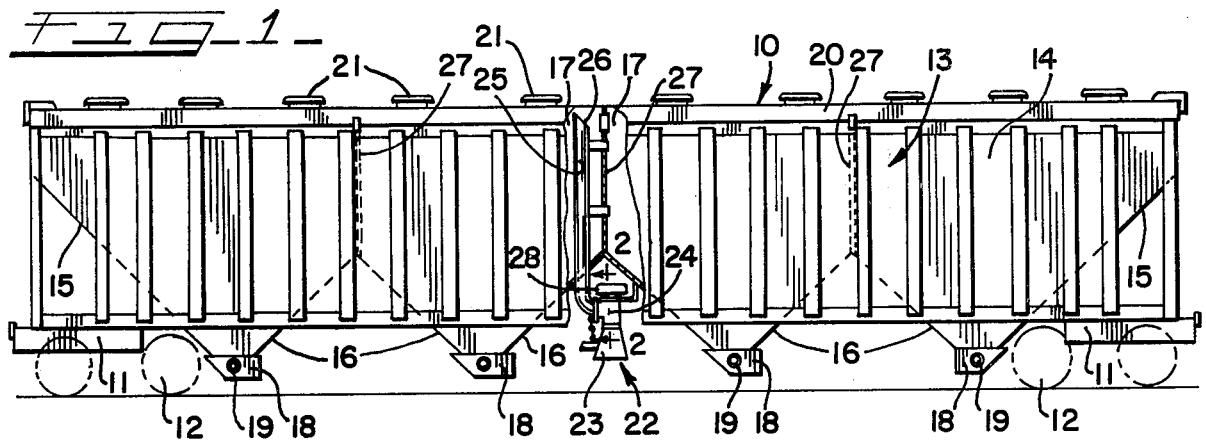
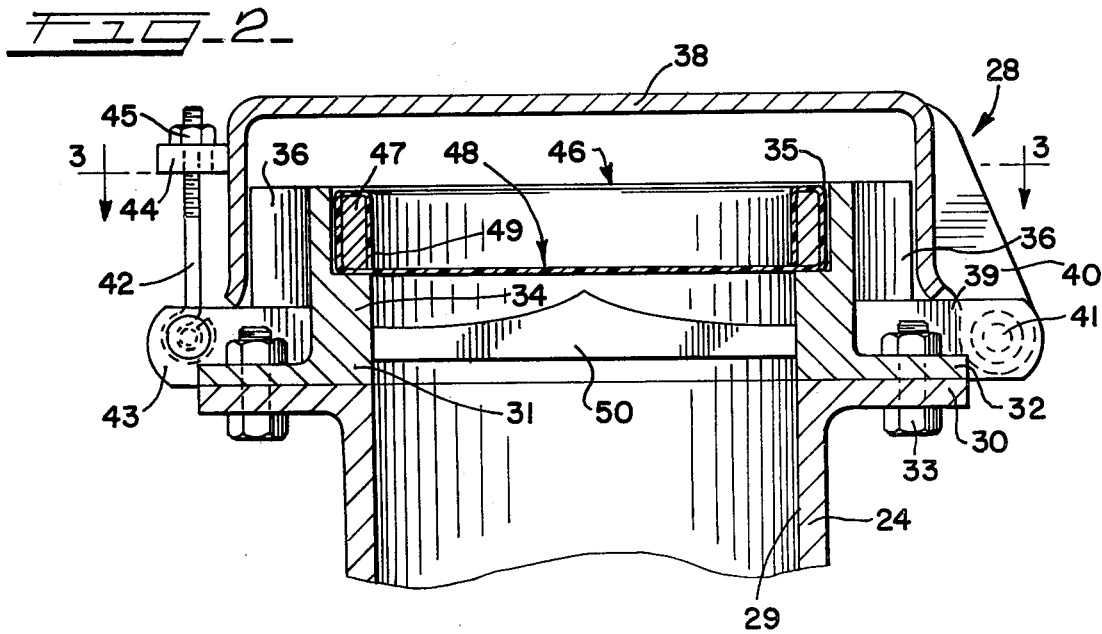
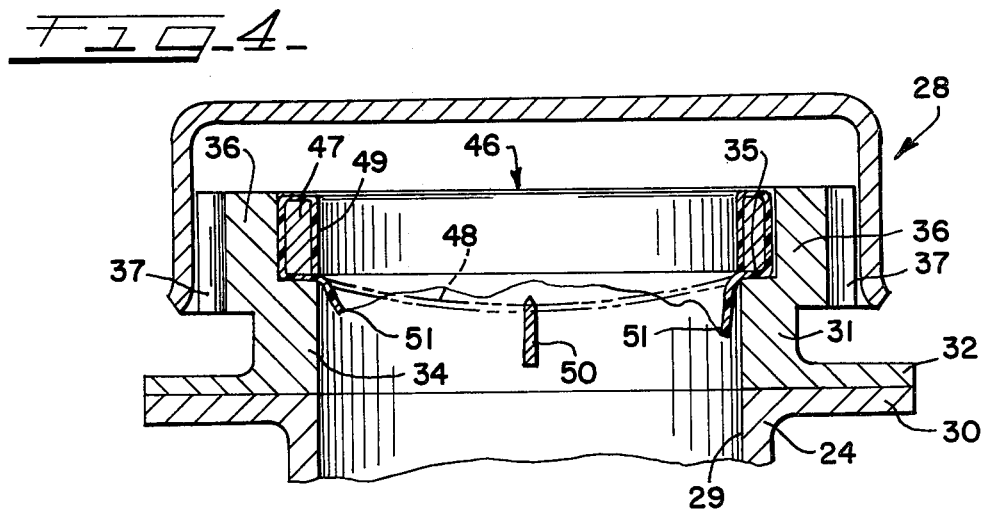

PRESSURE RELIEF VALVE

This application is a division of application Ser. No. 706,650 filed July 19, 1976 now U.S. Pat. No. 4,119,112.

BACKGROUND OF THE INVENTION

1. Field of the Invention

The present invention relates to safety vents or valves useful with pressurized tanks which includes rupturable valve members designed to relieve pressure occuring within a tank or hopper at a predetermined PSI in order to protect the structural integrity of the unit to which it is connected.

2. Description of the Prior Art

The prior art is disclosed in U.S. Pat. Nos. 3,145,874 Aug. 25, 1964, 3,294,277 Dec. 27, 1966, 3,526,336 Sept. 1, 1970, 3,685,686 Aug. 22, 1972, 3,797,511 Mar. 19, 1974, 3,834,581 Sept. 10, 1974 and 3,845,878 Nov. 5, 1974.

The present invention is an improvement over the above patented structures.

SUMMARY

The present invention is particularly adapted to closed or covered hopper cars which are provided with pneumatic gate arrangements for unloading the car. In unloading this type of car the gate is attached to a fluid pressure system causing a subatmospheric pressure within the car whereupon the material is discharged from the pneumatic gate usually to a pressurized conduit leading to a suitable storage bin or reservoir. The safety vent of the present system includes a tubular housing which is connected to a pipe extending vertically within the hopper car adjacent the roof thereof for allowing the entrance of air through a filter arrangement with which the safety vent is associated. The safety vent includes a rupturable valve or diaphragm which at a predetermined sub-atmospheric pressure within the car ruptures to alleviate the situation and protects the structural integrity of the tank or hopper. The diaphragm or valve in the present invention comprises a rubber-like material which is placed across the tubular wall of the housing in a stretched or tensioned condition and which when it ruptures is destroyed with the remains of the diaphragm receding or withdrawing substantially close to the inner wall of the housing thereby occupying a minimum of space area so that the flow of fluid through the housing is not impeded in any way.

A modified embodiment which is disclosed includes a diaphragm which comprises a circumferential wall and spaced parallel cylindrical walls the diaphragm being inflated in balloon like fashion and being supported by a ring which is removably positioned at the upper end of the tubular wall of the vent system. The presently disclosed valve diaphragms are unique in that upon rupture they do not in any way impede the free flow of fluid through the housing to the hopper or tank.

BRIEF DESCRIPTION OF THE DRAWINGS

FIG. 1 is a side elevational view of a hopper car having portions of the same broken away to illustrate an improved filtering end vent system;

FIG. 2 is a cross-sectional view taken substantially along the line 2—2 of FIG. 1;

FIG. 4 is a view similar to FIG. 2 disclosing the condition of a rupture valve or diaphragm.

DESCRIPTION OF THE PREFERRED EMBODIMENT

Figure 5:
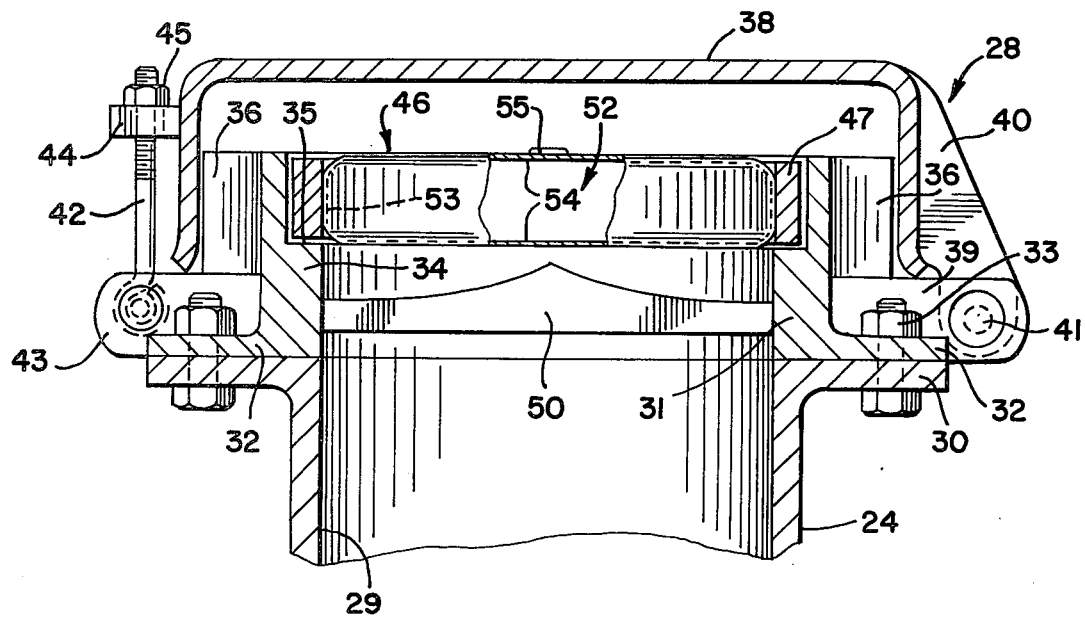
FIG. 5 is a cross-sectional view similar to FIG. 2 disclosing a modified diaphragm structure.

FIG. 1 discloses a closed hopper car 10 having conventional stub center sills 11 at opposite ends thereof which are supported on conventional wheel trucks 12. The car 10 includes a car body 13 having vertical car sides 14 and sloping end walls or sheets 15 connected to the car sides 14. The slope sheets or end walls 15 with intermediate slope sheets or walls 16, comprise and form a total of four separate hoppers 17 which are adapted to contain bulk material such as plastic pellets etc. The hopper car 10 is of the closed type and includes conventional pneumatic discharge gates 18 attached to each of the hoppers 17 at their lower ends thereof the same including capped discharge tubes 19 which during unloading are uncapped and connected to a suitable fluid pressurized system for unloading and conveying materials from the car.

The car 10 comprises a roof structure 20 including a plurality of longitudinally spaced hatch covers 21 which are removable for overhead loading purposes. The vent system or arrangement 22 comprises a filter 23 consisting of a tubular body or housing member 24 connected to a vent pipe 25 which extends upwardly within the car though one of the hopper walls terminating at its upper end in an opening 26 adjacent the roof structure. The filter 23 and its function in connection with the tubular body 24 is described in greater detail in the aforementioned related patent application. The tubular body and housing member 24 and pipe 25 are suitably supported on a central partition wall 27 and hopper wall 16, substantially centrally on the body and below thereof thus providing ready access to the operator for servicing the unit. The car also includes two other partition walls 27 thus dividing the car into the four hopper units as described.

Figure 3:
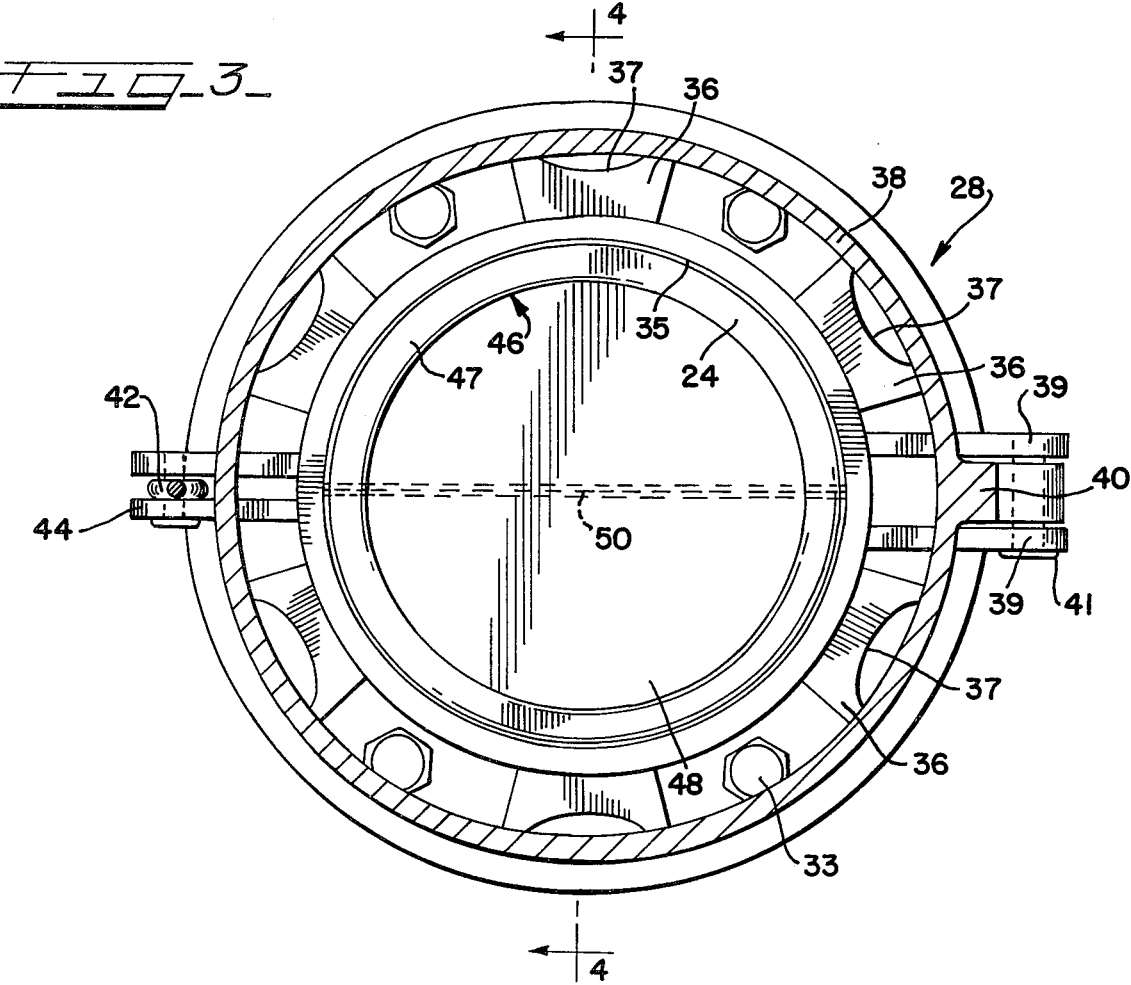
FIG. 3 is a cross-sectional view taken substantially along the line 3—3 of FIG. 2.

The present invention relates to a safety valve or vent system 28 which is positioned at the upper end of the tubular body or housing member 24. Referring particularly to FIGS. 2, 3 and 4, the vent 28 is provided at the upper end of the tubular body or housing member 24 which includes a vertical inner tubular wall 29. The wall 29 is provided at its upper end with a flange 30 which is connected by means of nuts and bolts 33, to a collar 31 having a flange 32. The collar 31 also includes an inner tubular wall 34 in registry with the wall 29. The upper end of the collar 31 is provided with an annular undercut seat 35. The outer circumferential surface of the collar 31 includes circumferentially spaced lugs 36 having outwardly directed arcuate indentations 37. The safety valve system 28 includes a cap 38 which may be hingedly removed to an opened position for service reasons that will be presently described. The collar 31 includes outstanding ears 39 and a hinge bracket 40 on the cap 38 is hingedly connected thereto by means of a hinge pin 41. A latch bolt 42 is pivotally connected to hinge ears 43 supported on the collar 31 and is adapted to engage in locked relation split latch lugs 44 held in this position by means of a nut 45. FIGS. 2, 3, and 4, disclose a valve assembly 46 comprising a rigid ring 47 having a diaphragm 48 connected thereto. The diaphragm 48 comprises a rubber-like material which is stretched across the ring and is securely fastened thereon by means of a wrapped and glued connection portion 49 enclosing the ring 47. While a rubber material is disclosed, any material which has a high resiliency and which when, ruptured will recede or diminish substantially in length, can be utilized. The ring 47 as disclosed in FIGS. 2, 3 and 4, is removably seated upon the annular undercut seat 35. As best shown in FIGS. 2 and 5, a conventional knife or piercing element 50 is disposed immediately below the valve 46.

FIG. 4 discloses the condition of the diaphragm 48 after it has ruptured wherein the stretched or pretensioned condition of the diaphragm results in the shredded or destroyed remaining pieces 51 having receded or withdrawn outwardly against the wall 34 thus permitting the uninterrupted or unimpeded flow of air therethrough.

In the modification of FIG. 5, the ring 47 supports a diaphragm 52 which comprises a circumferential vertical wall 53 integral with parallel spaced walls 54 one of which is provided with an inflating closure 55. The diaphragm 52 here again is of a rubber-like material and is held in an inflated condition against the ring 47 and which when ruptured it is substantially destroyed with the pre-stretched condition of the diaphragm causing only fragments to remain after destruction so that again the air can freely travel through the tubular wall 29 to the hopper.

Operation

In the uncapped position of the pneumatic discharge gates 18 a fluid pressure system is connected thereto and the material is withdrawn from the hoppers by suction to unload the same. Air enters through the filter 23 through the tubular body 24 and is discharged into the upper ends of the hoppers so that the material is discharged and flows freely through the pneumatic gates. The maximum sub-atmospheric pressure within the car during pneumatic unloading is one half PSI and any sub-atmospheric pressure below this figure causes the diaphragm 48 to be drawn by suction against the knife edge 50 thereby rupturing the diaphragm and permitting the entrance of air through the housing and pipe into the car. Thus, the safety vent guarantees that any malfunction of the filter or air coming therethrough which if impeded in any way will permit air to enter into the car when the diaphragm is ruptured thus assuring that the walls of the car cannot be inadvertently collapsed because of the lowering of the sub-atmospheric pressure below one-half PSI.

In the prior art above described, and generally in the field of safety vents, many different types of rupturable diaphragms or discs have been provided. These generally have consisted of material such as paper, aluminum, plastic, etc. and will function well particularly in tank cars wherein high pressures are encountered and where the ruptured material is subjected to said high pressures so that the flow of fluid through the tubular housing is not generally impeded. However in the utilization of hopper cars which are placed under a sub-atmospheric pressure of at least one-half PSI, difficulties with the diaphragms of the prior art have been encountered. The paper or plastic disc in sub-atmospheric pressure utilization would partially rupture when encountering the knife edge 50. However the blade would provide a center support for the disc to prevent the disc from completely rupturing at the maximum pressure permitted in the car. As a result, at the low pressure, the disc would remain supported in position across the tubular wall substantially impeding the flow of air through the housing to relieve the pressure within the hopper car. In the present invention, the stretched rubber having stored up energy due to the stretching, completely ruptures with the destroyed condition of the diaphragm being disclosed in FIG. 4, wherein the fragments 51 have receded exposing substantially the entire throat opening of the collar 31 and providing for the free flow of air through the housing walls 29. Thus for the type of operation of a hopper which is pneumatically unloaded the structure of the present invention provides a diaphragm which will function to ensure adequate safety protection.

In FIG. 5 a modified valve 46 includes a balloon like diaphragm 52 which is inflated and which is tightly held against the inner circumference of the ring 47. Upon rupture the balloon will collapse because of the pre-stretched, or tensioned rubber material, and the fragmentary elements remaining will not substantially prevent the inflow of air through the collar 31 and tubular member 24. The inflated ballon diaphragm may be suitably attached to the inner circumferential wall of the ring 47 so that the fragments remain with the ring after rupture or if desired the inflation of the diaphragm 52 is sufficient to maintain its position tightly against the inner surface of the ring 47 and when ruptured it will disintegrate into shreds which are removed through the tubular member 29 and are discharged with the material.

The cap 38 of course can be easily removed for replacing any ruptured diaphragm and is easily placed in position on the annular lugs 35 of the collar 31.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A safety vent for a covered hopper car having a hopper and a pneumatic discharge mechanism adapted to be connected to a fluid pressure system for material unloading, comprising;

a tubular member having a tubular wall providing a passage therein, one portion thereof connected to and communicating with the interior of said hopper car, said tubular wall having a second portion communicating with the atmosphere, a valve member rupturable at a predetermined design pressure supported on said tubular member between said tubular portions to block fluid flow through said tubular member, said valve member being a balloon-like element expanded within said member and including a stretchable diaphragm stretched transversely across said tubular wall which upon rupture of the said member torn portions of said diaphragm recede in a radially outward direction toward said tubular wall so as not to impede the fluid flow therethrough.

2. A safety vent for a covered hopper car having a hopper and a pneumatic discharge mechanism adapted to be connected to a fluid pressure system for material unloading, comprising;

a tubular member having a tubular wall, one portion thereof connected to and communicating with the interior of said hopper car, said tubular wall having a second portion communicating with the atmosphere, a valve member rupturable at a predetermined design pressure supported on said tubular member between said tubular portions to block fluid flow through said tubular member, said valve member including a stretchable diaphragm stretched transversely across said tubular wall in tensioned condition whereupon rupture of the same, said diaphragm is substantially destroyed to permit flow of fluid through said tubular member, and said diaphragm being of cylindrical shape having a circumferential wall and spaced parallel walls connected thereto, the same being inflated in balloon-like condition to maintain said stretched condition.

3. The invention in accordane with claim 2, said valve including a containment ring supporting said diaphragm in said stretched condition on said one tubular portion.

4. The invention in accordance with claim 3, said tubular member having an annular shoulder and said ring being supported on said shoulder.

5. The invention in accordance with claim 4, including a piercing member on said tubular member supported on one side of said diaphragm.

* * * * *